United States Patent [19]
Brown

[11] Patent Number: 5,447,110
[45] Date of Patent: Sep. 5, 1995

[54] COLLAPSIBLE CONTAINER

[76] Inventor: Wesley J. Brown, 301 N. 6th Ave., Hastings, Nebr. 68901

[21] Appl. No.: 918,597

[22] Filed: Jul. 24, 1992

[51] Int. Cl.$^6$ ............................................. B65D 37/00
[52] U.S. Cl. ........................................ 141/2; 141/18; 141/98; 141/114; 224/42.14; 222/530; 220/666; 220/905
[58] Field of Search ............... 224/42.12, 42.13, 42.14; 141/2, 18, 98, 114; 220/666, 705, 707, 708, 905; 222/92, 107, 206, 215, 466, 530, 538; 215/1 C

[56] References Cited

U.S. PATENT DOCUMENTS

| | | | |
|---|---|---|---|
| 2,516,728 | 7/1950 | Smith | 222/538 X |
| 2,852,174 | 9/1958 | Mauerer | 224/42.14 |
| 2,886,084 | 5/1959 | Davison | 220/666 |
| 4,069,946 | 1/1978 | Flider | 222/538 X |
| 4,488,584 | 12/1984 | Hesthave et al. | 141/339 |
| 4,592,492 | 6/1986 | Tidmore | 222/209 |
| 4,873,100 | 10/1989 | Dirksing et al. | 215/1 C X |
| 4,898,301 | 2/1990 | Schick | 220/408 |
| 4,993,610 | 2/1991 | Abretske et al. | 224/42.13 X |
| 5,195,661 | 3/1993 | Light | 222/105 |

Primary Examiner—J. Casimer Jacyna
Attorney, Agent, or Firm—Vincent L. Carney

[57] ABSTRACT

To store an emergency container in the hub cavity of a spare tire within the trunk compartment of an automobile with a spare tire, the container is collapsible, having a top end and a bottom end with handles on each of said top end and bottom end to permit the container to be expanded. An opening extends along the axis of the container to receive a spindle for holding the collapsed container in the center of the spare tire until needed. The walls of said container containing foldable members to permit collapsing and opening of the container.

6 Claims, 3 Drawing Sheets

COLLAPSIBLE CONTAINER

BACKGROUND OF THE INVENTION

This invention relates to collapsible containers.

One class of collapsible container has walls formed of a foldable material. These containers are designed to be stored in compressed shape for use such as for the addition of liquid at a later date.

One prior art type of such collapsible container is disclosed in U.S. Pat. No. 3,101,921 to Price, issued Aug. 27, 1963. This collapsible container is designed for aircraft. Such containers are generally large having a capacity of 50 to 100 gallons and commonly requiring an uncollapsed dimension of between ten feet in length and five feet in diameter.

These prior art fuel tanks have a disadvantage in that they are not suitable for many uses such as for use with an automobile. Indeed, when fully inflated with fuel, additional rigid supports are needed for strength to maintain the integrity of the elastomeric walls.

Another prior art type of collapsible container is a collapsible container used for soft drinks and the like. One such collapsible container is described in U.S. Pat. No. 4,492,313. This type of collapsible container is generally cylindrical having a diameter of three or four inches and is not designed to support heavy weight. Indentations in the base and the neck of the collapsible containers used for soft drinks form handles for expanding the container if desired.

The collapsible containers used for soft drinks have several disadvantages, such as: (1) they can not be readily expanded because of the absence of easily graspable handles; (2) they are usually too small in diameter to contain a significant amount of fuel; (3) they rely upon a single opening both to pour the liquid and to serve as an air vent; and (4) they are not designed to support heavy weight.

SUMMARY OF THE INVENTION

Accordingly, it is an object of the invention to provide a novel collapsible liquid container.

It is a further object of the invention to provide a novel technique for storing liquid containers suitable for use with automobiles and other smaller vehicles.

It is a still further object of the invention to provide a collapsible fuel container that is easily expandable and from which fuel may be easily dispensed.

It is a still further object of the invention to provide a collapsible fuel container which may be readily expanded to contain at least two gallons of gas and be collapsible into a space of less than five inches in lateral height and have a diameter of ten inches or less.

It is a still further object of the invention to provide a collapsible container that, when collapsed, can receive a threaded spindle of the type commonly found in the spare tire compartments of automobiles for fastening it in place.

It is a still further object of the invention to provide a collapsible container which may be used for automobile fuel or for other liquids such as water in an emergency.

In accordance with the above and further objects of the invention, a collapsible container is formed which, when collapsed, has a distance from its center to the most remote location on its sides in a plane parallel to its sides and perpendicular to its central axis of no more than five inches and has a thickness or height of no more than five inches. When expanded, it should contain at least two gallons of liquid.

Preferably, the container: (1) has accordian-like pleats circumscribing a tubular body along its sides to provide convenient folding; (2) is cylindrical; (3) has a detachable spout on top which may be threaded in place and sealed; (4) has a vent suitable for permitting the smooth pouring of the fluid; (5) has handles that extend from side to side on the container's top and bottom; and (6) has an opening in a central location of the container from the container's top to its bottom by which, when the container is collapsed, it may be fitted onto the threaded spindle in a spare tire compartment of an automobile or other location where a spare tire may be located. In the preferred embodiment, the container is cylindrical, the opening extends along the axis of the cylinder and the handle extends along the diameter of the cylinder.

In use, the container is carried in a vehicle, preferably in the wheel hub cavity of the spare tire of the automobile in collapsed form. In an emergency situation, it is removed in collapsed form, where it has been stored with a diameter of less than ten inches and a height of less than five inches. Handles on both ends are grasped and pulled to expand it.

After the container is expanded, liquid may be poured into an opening in one end of the container. The opening is sufficiently large to receive the liquid either with or without a funnel and is preferably at least an inch in diameter. A detachable spout is provided which may be threaded into that opening to form a fluid-tight seal for later pouring of the liquid. An air vent is provided at another location on the same end of the container as the opening for the spout to enable turbulent-free pouring of the liquid.

In one embodiment, the container may be used as a safety or warning device, and for that purpose, reflective tape is provided for the ends of the container or reflective paint for its sides.

From the above summary, it can be understood that the container of this invention has any of several advantages, such as for example: (1) it fits conveniently in a small space such as the wheel hub cavity of the spare tire of an automobile; (2) it may be held in the trunk compartment of an automobile with a conventional threaded spindle usually already in place for a spare tire; (3) it can contain sufficient gas or water for most emergency uses; (4) a spout may be conveniently attached to it with a fluid-tight seal; (5) it has conveniently formed handles that enable it to be carried when filled with a fluid and enable it to be conveniently expanded; (6) it is relatively easy to fill; (7) it may be manufactured from recycled plastic; and (8) because it is collapsible, it reduces the transportation cost for the manufacurer to the retailer.

SUMMARY OF THE DRAWINGS

The above and further features of the invention will be better understood from the following detailed description when considered in connection with the accompanying drawings in which.

DETAILED DESCRIPTION

Figure 1:
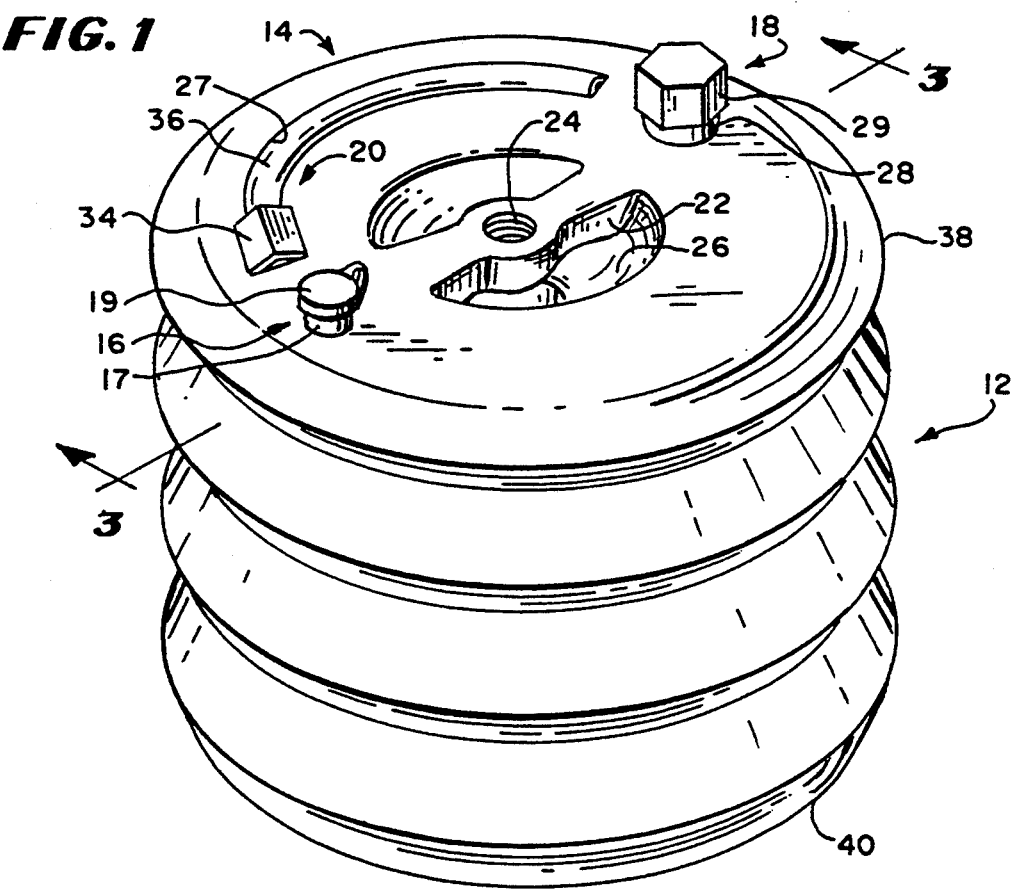
FIG. 1 is a perspective view of an embodiment of collapsible container in accordance with the invention.

In FIG. 1, there is shown a perspective view of a container 10 in expanded form as it would appear if filled with automobile fuel or water, having a corrugated side portion 12, a flat top portion 14, a vent outlet 16, an inlet-outlet 18, and a stored spout 20. The container of this invention when expanded has a side wall, which may show some signs of corrugation or structure intended to be collapsed into a corrugated configuration. As expanded, the walls may be smooth walls having the corrugated structure entirely pulled free or have walls which have been formed permanently as corrugations but in which the individual members can be folded together into a more compressed shape.

In the preferred embodiment, the container 10 is cylindrical, having a substantially flat disk shaped top surface 14 with a first holder or handle 22 formed as a strap-like member and having a centrally located opening 24 for receiving a spindle of an automobile tire holder from the trunk of an automobile to be described hereinafter. A first depressed portion 26 is aligned with a longitudinal central axis under the handle portion 22 and adapted to permit the user to slide his hand for pulling apart the collapsed container into the shape shown in FIG. 1 and a second depressed portion 27 is elongated and adapted to receive the spout 20.

To permit liquid to be poured into the container 10 or poured from the container 10, the inlet-outlet 18 has a tubular upwardly extending threaded member 28 and a closure 29. The tubular upwardly extending member 28 extends in a direction parallel to the longitudinal axis of the container 10 and is externally threaded, being adapted to receive the internally threaded cap 29 which serves as a closure therefor. The air vent 16 is similarly formed as a tubular cylinder 17 extending upwardly to receive a press fittable cap 19. While tubular upwardly extended openings have been shown for the air vent 16 and inlet-outlet fixture 18, other shapes may be utilized instead with appropriate fasteners for a nozzle and the vent may be flush with the upper surface and contain breakable seals or the like.

The spout 20 includes a threaded end member 34 having the same internal diameter as the outside diameter of the inlet-outlet fixture 18 to permit threading thereon for a fluid-tight seal and a flexible extending hose or tube 36 extending therefrom through which fluid may be poured.

Figure 2:
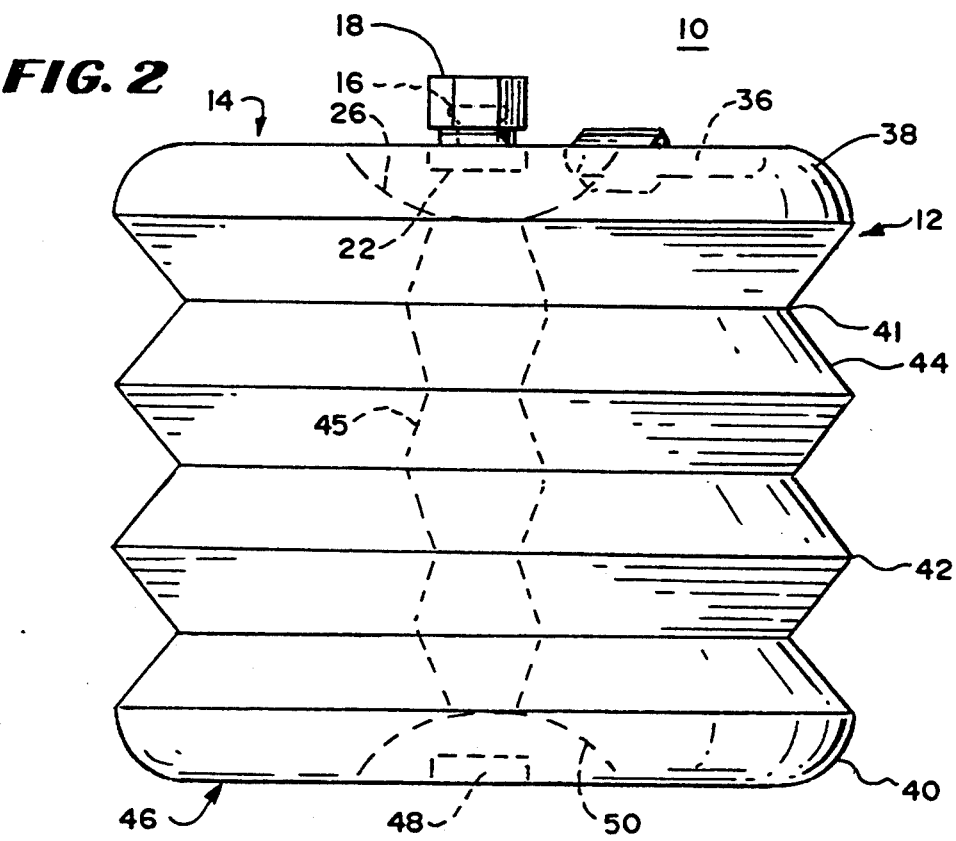
FIG. 2 is an elevational view of the embodiment of FIG. 1.

As best shown in the elevational view of FIG. 2, the corrugated generally cylindrical side portions 12 have at the top and bottom generally dish shaped thicker support members 38 and 40 respectively of sufficient strength so that, when the container 10 is full of liquid, they substantially retain their shape. The corrugations along the length of the side surfaces may be formed of thinner members for easier bending and may be plastic members having central grooves 41 and peaks 42 parallel to each other forming circles and joined by substantially flat side members 44. The bottom surface 46 of the expanded container is similar in construction to that of the top surface 14 and includes a similar handle or holder member 48 and depressed portion 50. The indentation for holding the spout 20 (FIG. 1) is, however, not required on the bottom end nor are the inlet-outlet fixture 18 or air vent 16.

Aligned with the longitudinal central axis of the container 10 is a tubular wall 45 which extends concentric with the side walls 12 throughout the length of the container from depression 26 to depression 50 and is sufficiently solid to prevent liquid from flowing therethrough. It is aligned with the openings in the top and bottom handle members 22 and 48 to, when collapsed, permit a spindle located in the trunk for a spare tire to pass through the collapsed container 10. For this purpose, it has an internal diameter in the range of between one-sixteeth inch to one-half inch.

Figure 3:
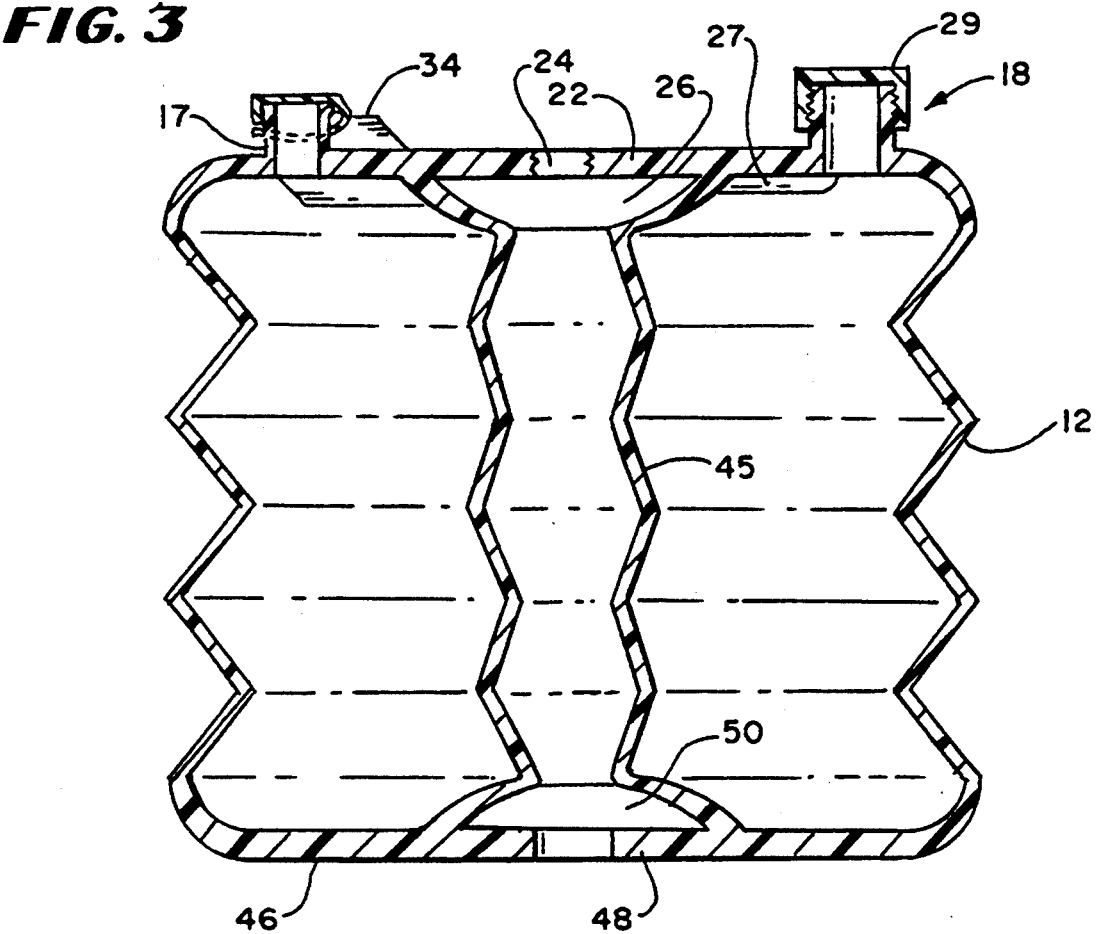
FIG. 3 is an elevational sectional view taken through lines 3—3 of the embodiment of FIG. 1.

In FIG. 3, there is shown an elevational sectional view through lines 3—3 of FIG. 1 showing the corrugated side walls 12, the end walls 14 and 46 and the central tubular member 45. As best shown in these views, the tubular member 45 is formed of a solid plastic or other material and has corrugations corresponding to those of the side walls 12 so as to be collapsible° It opens into the walls of the top and bottom handle depressions 26 and 50 to form an integral solid tube into which liquid cannot flow from the internal portions of the container 10. As shown in this view, liquid poured into the inlet 18 can be contained in the container 10 because it has solid surfaces extending downwardly to form a complete integrally formed solid liquid-tight torus-shaped container having bottom and side surfaces which are unbroken.

The materials for the side walls 12 and inner members should be sufficiently flexible to permit bending into a compressed shape or may be formed with different thicknesses forming cylindrical rings to provide such bending. In the preferred embodiment, they are solid integrally formed walls formed of any of the plastics polypropylene, neoprene, nylon, aceto-butyrate, vinyl and ethyl cellulose that are sufficiently elastomeric to provide for adequate bending and corrugating and resistant to and safe for storage of gasoline. The walls may be formed by any of the appropriate methods of injection molding, blow molding, rotational molding or forming in sections and fastening together.

When expanded, the container 10 should have a carrying capacity of at least two gallons but no more than five gallons, a height of at least three inches to ten inches and a diameter of at least between five inches and no more than ten inches. In the preferred embodiment, it has a diameter of ten inches and an expanded height of eight and one-half inches exclusive of the top and bottom stiffened portions, each of which extend downwardly one and one-half inches.

The handles or holders 22 and 48 in the top and bottom should be at least three inches in length and the central hole 24 should be large enough to receive conventional threaded bolts or spindles from the trunk of cars and generally would be three eights to one-half inch in diameter.

In the preferred embodiment, the inlet-outlet 18 has an external diameter of one inch, a height of three-eighths of an inch and external threads, which may be formed of the same material for convenience in fabrication or may be formed of a different material and welded in place or contain an inner member with an outer threaded member positioned over and fastened to the inner member. The threads in diameter are adapted to fit the internal threads of the spout 20.

Figure 4:
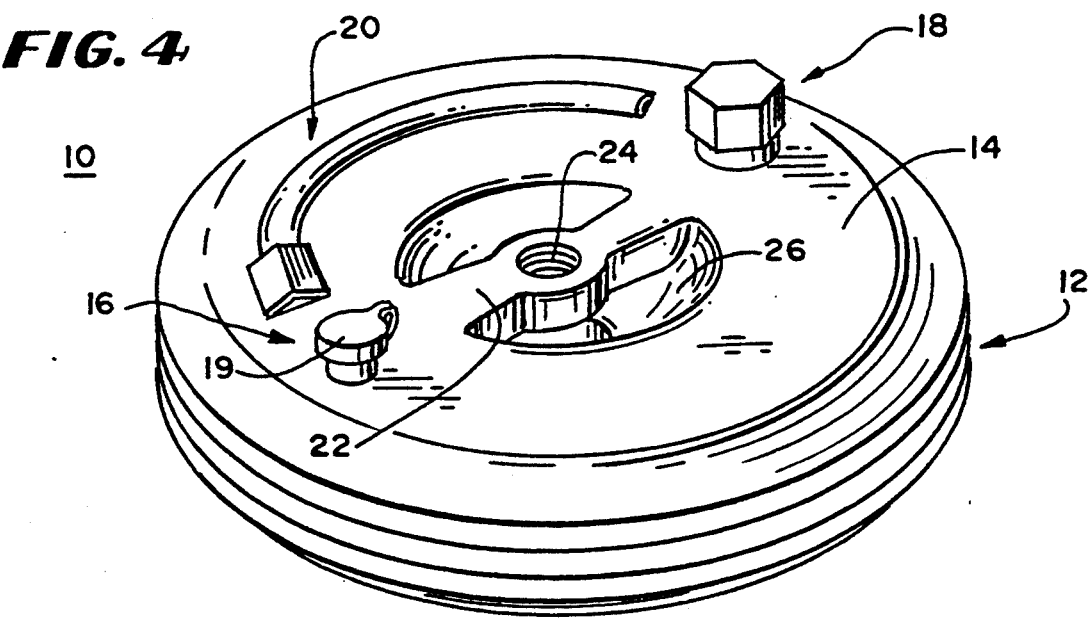
FIG. 4 is an elevational view of the container of FIG. 1 shown as collapsed for storage.

In FIG. 4, there is shown a perspective view of a container 10 collapsed for storage showing the corrugated walls 12 bent against each other so that the container occupies a height along its axis no greater than five inches. In this form, its diameter still must not extend greater than ten inches.

Figure 5:
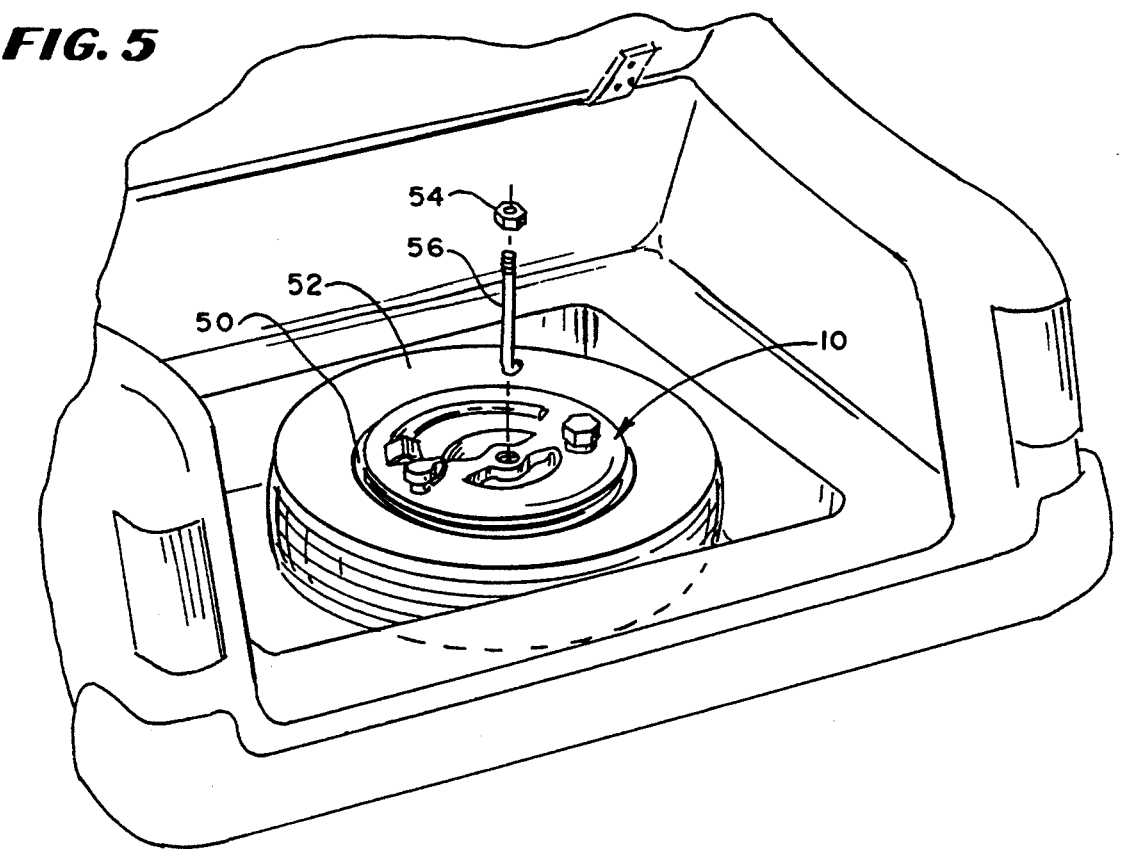
FIG. 5 is a fragmentary simplified view of the embodiment of FIG. 4 shown stored in the wheel hub cavity of the spare tire in the trunk of an automobile.

In FIG. 5, there is shown a simplified fragmentary exploded perspective view of the wheel hub 50 of an automobile having a spare tire 52 in place and showing a nut 54 for the threaded holding spindle and a spindle 56 exploded away above the container 10 which is in collapsed form in a central portion of the tire. In some embodiments, another holding member such as the base of a jack or the like may fit over the container, and in others there is a smaller rounded washer member holding it in place.

Figure 6:
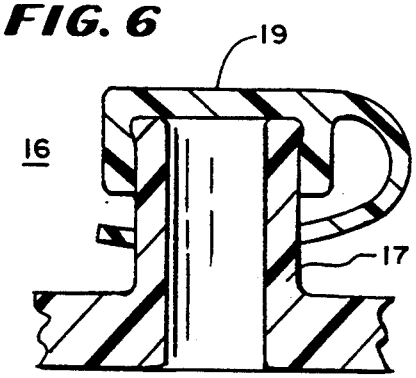
FIG. 6 is a fragmentary enlarged sectional view of a vent hole forming a portion of the embodiment of FIG. 1.

In FIG. 6, there is shown a fragmentary simplified sectional view of the vent opening 16 having a plastic cap 19 and a tubular upwardly extending integrally formed member 17 which, when the cap 19 is removed, permits the flow of air into the container. The cap 19 forms a press fit for closing the vent hole when the emergency container is being carried. In the preferred embodiment, the internal diameter of the tubular opening is three-eighths of an inch. The inside of the cap 19 corresponds so as to form a tight fit thereover.

Figure 7:
FIG. 7 is a bottom view of the embodiment of FIG. 1.

In FIG. 7, there is shown an elevational view of the bottom of the container 10 having reflective tape or other reflective members on it and containing, in some embodiments, words indicating the need for assistance or warning so that the headlights of oncoming cars will be reflected therefrom.

In use, the container 10 is located in a convenient location in the automobile, usually within the hub cavity of a spare tire which may be in the trunk or other location on the automobile. It receives the spindle used to hold the wheel in place through its central opening and is fastened in place in the same manner as the spare tire. It may be maintained in this location until needed such as when running out of gas or if fluid is needed to put in a radiator because of an overheating engine or the like.

When needed, the nut on the top of the spindle for holding the tire is unthreaded and removed and the collapsed container 10 is pulled around the central threaded spindle off of its location. The end handles 22 and 48 may then be grasped by inserting the fingers through the openings therearound and pulling the two apart so that it is in expanded form. Preferably, it will not be expanded until the user has carried it to the source of the fluid, such as a gas station or the like.

Before fluid is poured into it, the inlet-outlet threaded cap 29 is unthreaded and removed and the vent cap 19 pulled upwardly so that there is an inlet-outlet opening and a vent opening in the top of the container.

After the cap has been removed from at least one of the vent hole and the inlet-outlet opening, the user puts his hands into the depressed portions under the handles and pulls the two ends apart so as to expand the container if this was not done earlier. The cap must then be removed from either the inlet-outlet opening or the vent opening if both have not already been opened.

With the inlet-outlet opening free of its cap and the vent opening free of its cap, liquid is poured into the container to the level desired. The caps are then replaced, and the container is ready to be carried back to the automobile for use.

When the filled container has been brought back to the automobile, the fluid is poured into the gas tank or the radiator of the automobile or the like as appropriate. The ends of the container are then pressed together to collapse the container and the caps replaced. It may then be stored again within the spare tire or other convenient location and fastened in place by passing the threaded spindle for the tire through the center aperture and threading the nut back in place.

From the above detailed description, it can be understood that the container of this invention has any of several advantages, such as for example: (1) it fits conveniently in a small space such as the wheel hub cavity of the spare tire of an automobile; (2) it may be held in the trunk compartment of an automobile with a conventional threaded spindle usually already in place for a spare tire; (3) it can contain sufficient gas or water for most emergency uses; (4) a spout may be conveniently attached to it with a fluid-tight seal; (5) it has conveniently formed handles that enable it to be carried when filled with a fluid and enable it to be conveniently expanded; (6) it is relatively easy to fill; (7) it may be manufactured from recycled plastic; and (8) because it is collapsible, it reduces the transportation cost for the manufacurer to the retailer.

Although a preferred embodiment of the invention has been described with some particularity, many modifications and variations of the invention are possible in the light of the above teachings. Therefore, it is to be understood that, within the scope of the appended claims, the invention may be practiced other than as specifically described.

What is claimed is:

1. A method of bringing fluids to an automobile comprising the steps of:
    obtaining access to a spare tire of an automobile;
    removing a holder for the spare tire;
    removing a collapsed container from the center of the spare tire wherein the collapsed container has corrugated side walls, a longitudinal opening in its center, a height no greater than ten inches and a diameter of no more than ten inches;
    expanding the container by grabbing two end handles and pulling it apart so that it expands from a height of less than five inches with corrugated side walls to a size and shape with relatively smooth side walls and being capable of holding at least two gallons; and
    filling the container with liquid.

2. A method according to claim 1 in which the container is carried to a gas station prior to filling.

3. A method according to claim 2 in which at least one of a vent cap and an inlet-outlet cap are removed before expanding the container.

4. A method according to claim 2 further including the steps of removing a vent cap and an inlet-outlet cap; filling the container with liquid and replacing the caps.

5. A method according to claim 4 further including the steps of:
    collapsing the container after emptying it;
    obtaining access to the spare tire of the automobile; and reinserting the container.

6. A method according to claim 5 in which the step of reinserting the container includes the step of placing the container in the center of the spare tire with a tire holding spindle passing through a longitudinal opening in the container.

* * * * *